United States Patent [19]

Ostlinning et al.

[11] Patent Number: 5,242,960
[45] Date of Patent: Sep. 7, 1993

[54] FLAMEPROOFED NON-DRIP POLYAMIDE MOLDING COMPOUNDS

[75] Inventors: Edgar Ostlinning, Duesseldorf; Aziz El Sayed, Leverkusen; Klaus Sommer, Cologne; Hans G. Fröhlen, Leverkusen, all of Fed. Rep. of Germany

[73] Assignee: Bayer Aktiengesellschaft, Leverkusen, Fed. Rep. of Germany

[21] Appl. No.: 820,198

[22] Filed: Jan. 13, 1992

[30] Foreign Application Priority Data

Jan. 25, 1991 [DE] Fed. Rep. of Germany ........ 4102104

[51] Int. Cl.$^5$ ............................................. C08K 5/5313
[52] U.S. Cl. ..................... 524/126; 524/116
[58] Field of Search ............... 528/158; 524/134, 135, 524/405, 116, 126; 525/429

[56] References Cited

U.S. PATENT DOCUMENTS

| | | | |
|---|---|---|---|
| 3,377,317 | 4/1968 | Hoxie | 528/158 |
| 3,527,725 | 9/1970 | Strauss et al. | 528/158 |
| 3,808,289 | 4/1974 | Okuhashi et al. | 528/158 |
| 4,621,123 | 11/1986 | Takagishi et al. | 528/158 |
| 5,021,488 | 6/1991 | Fuhr et al. | 524/116 |
| 5,102,931 | 4/1992 | Fuhr et al. | 524/116 |

FOREIGN PATENT DOCUMENTS

| | | |
|---|---|---|
| 0332965 | 9/1989 | European Pat. Off. |
| 0413167 | 2/1991 | European Pat. Off. |
| 0416259 | 3/1991 | European Pat. Off. |
| 992795 | 10/1962 | United Kingdom |

*Primary Examiner*—Veronica P. Hoke
*Attorney, Agent, or Firm*—Connolly & Hutz

[57] ABSTRACT

The invention relates to flameproofed non-drip polyamide molding compounds which contain certain quantities of a) phosphinic acid esters of polyphenols still containing free phenolic OH groups,
b) zinc borate and/or zinc oxide,
c) thermoplastics having a predominantly aromatic main chain, optionally
d) antidripping agents (for example polyfluoroethylene polymers) and, optionally, reinforcing materials and/or mineral fillers and other additives for processing, stabilization, etc.

15 Claims, No Drawings

FLAMEPROOFED NON-DRIP POLYAMIDE MOLDING COMPOUNDS

This invention relates to flameproofed non-drip polyamide molding compounds which contain certain quantities of a) phosphinic acid esters of polyphenols still containing free phenolic OH groups,
b) zinc borate and/or zinc oxide,
c) thermoplastics having a predominantly aromatic main chain, optionally
d) antidripping agents (for example polyfluoroethylene polymers) and, optionally, reinforcing materials and/or mineral fillers and other additives for processing, stabilization, etc.

Esters of phosphinic acids and alcohols or phenols are known. They have already been proposed as flameproofing agents. Phosphinic acid esters of dihydric alcohols or monohydric or polyhydric phenols are claimed in DE-OS 3 219 047 as flameproofing agents for molding compounds of polyphenylene oxide and an impact-modified polymer of an aromatic monovinyl compound. Resorcinol, pyrocatechol and phloroglucinol are mentioned in particular as polyhydric phenols.

Phosphinic acid esters of phenol-aldehyde/ketone condensates are not mentioned. The use of phosphinic acid esters of the claimed type as flameproofing agents for polyamides in conjunction with zinc borate and, optionally, antidripping agents, such as polyfluoroethylene polymers for example, has never been described either.

The present invention relates to flameproofed non-drip polyamide molding compounds which contain the following additions per 100 parts by weight molding compound:

a) 3 to 25% by weight and preferably 5 to 22% by weight partly esterified polyphenol phosphinic acid esters containing 3 to 75% free phenolic OH groups (OX=OH), preferably at least 5 to 40% free phenolic OH groups and, more particularly, 10 to 30% free phenolic OH groups in addition to the phosphinic ester OX groups corresponding to formula (I)

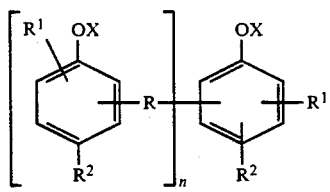

(I)

in which
X=H and the group —P(O)R³R⁴,
n is an integer of 1 to 20 and preferably 2 to 10,
R is a $C_{1-4}$ alkylene group, preferably methylene, a $C_{5-9}$ cycloalkylene group or, where n=1, even a direct bond, a sulfonyl or carbonyl group or oxygen or sulfur,
$R^1$ and $R^2$ are hydrogen, halogen, $C_{1-12}$ alkyl groups, preferably methyl, ethyl, propyl and butyl (n, i, t) groups, $C_{5-8}$ cycloalkyl groups, $C_{6-10}$ aryl groups, more particularly phenyl, tolyl or xylyl groups, $R^3$ and $R^4$ may be the same or different and represent $C_{1-12}$ alkyl groups, cycloalkyl groups containing 5 to 8 carbon atoms in the ring and optionally up to 3 alkyl substituents at the cycloalkyl ring or $R^3$ and $R^4$ together represent an alkylene radical which may be saturated or unsaturated and additionally contains 4 to 8 carbon atoms in the ring and, optionally, 1 to 3 $C_{1-4}$ alkyl substituents, preferably methyl substituents, at the ring, b) 1 to 15% by weight and preferably 3 to 12% by weight zinc borate and/or zinc oxide,
c) 0 to 30% by weight and preferably 5 to 25% by weight of a thermoplastic having a predominantly aromatic main chain and, optionally, other additives from the series d) 0 to 3% by weight and preferably 0.5 to 2% by weight antidripping agents (for example polytetrafluoroethylene polymers),
e) 0 to 40% by weight and preferably 10 to 30% by weight inorganic reinforcing materials and/or mineral fillers and/or pigments,
f) 0 to 10% by weight and preferably 0.5 to 5% by weight processing aids and
g) 0 to 20% by weight typical additives for polyamides, such as UV, light and heat stabilizers, known impact modifiers and compatibility promoters.

In a preferred embodiment, the quantities added in the polyamide blend should not exceed a total of 65% by weight and preferably 60% by weight; the partial quantities should also be limited; thus, the total quantities of the flameproofing additives (a+b+c) should not exceed 50% by weight, preferably 45% by weight and, more preferably, 40% by weight while the total quantity of additives (d+f+g) should not exceed 25% by weight of the polyamide blend.

The phosphinic acid esters (II) used in accordance with the invention are alkyl and aryl phosphinic acid esters of polyphenols which are only partly esterified at the phenol groups, containing 3 to 75%, preferably 5 to 40% and, more preferably, 10 to 30% free phenolic groups (—OX)=(OH). The polyphenols are condensation products of phenols with aldehydes or ketones. Preferred phosphinic acid esters (II) are alkyl and aryl phosphinic acid esters of relatively high molecular weight phenol/formaldehyde condensates (known generally as novolaks)

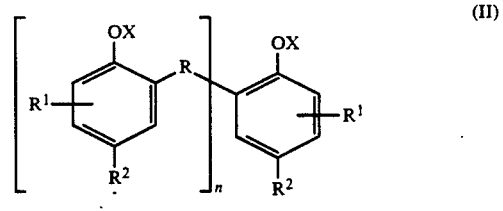

(II)

in which
n, R, $R^1$ and $R^2$ are as defined for formula I) and
X is either hydrogen or —P(O)R³R⁴ (phosphinic ester group) and $R^3$ and $R^4$ may be the same or different and represent $C_{1-12}$ alkyl groups, $C_{5-8}$ cycloalkyl groups or, together, represent an alkylene radical which may be saturated or unsaturated and contains 4 to 10 carbon atoms in the ring or as ring and alkyl substituents.

In a particularly preferred embodiment, the phosphinic acid esters are partly phosphinic-acid-esterified compounds corresponding to formula (III)

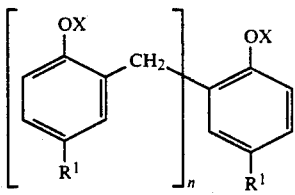

(III)

in which
n is preferably 2 to 6,
R[1] is hydrogen or a methyl group and
X in the moiety OX is hydrogen or a group corresponding to formula (IV)

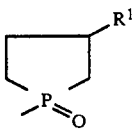

(IV)

The above-mentioned quantitative requirements again apply in regard to free phenolic OH groups (OH=OH in addition to the phosphinic ester groups.

Polyamides in the context of the invention are any amorphous or partly crystalline, predominantly aliphatic/cycloaliphatic thermoplastic polyamides which are prepared from predominantly aliphatic/cycloaliphatic diamines and dicarboxylic acids and/or lactams by the known polycondensation and/or polymerization process. Starting materials are aliphatic or mixed aliphatic/aromatic dicarboxylic acids, such as adipic acid, 2,2,4- and 2,4,4-trimethyl adipic acid, azelaic acid, sebacic acid, decane dicarboxylic acid, dodecane dicarboxylic acid, cyclohexane dicarboxylic acid, isophthalic acid and terephthalic acid, and aliphatic and aromatic diamines, such as hexamethylene diamine, 2,2,4- and 2,4,4-trimethyl hexamethylene diamine, diaminodicyclohexyl methane isomers, diaminodicyclohexyl propane isomers and isophorone diamine (isomers), xylylene diamines, aminocarboxylic acids, such as ε-aminocaproic acid and ω-aminocarboxylic acids, such as ω-aminoundecanoic acid and ω-aminolauric acid, and also salts of these compounds.

Copolyamides of several of the monomers mentioned may also be used.

Preferred polyamides are polyamide-6, polyamide-4,6, polyamide-6,6, polyamide-6,10, polyamide-6,12, polyamide-11, polyamide-12, polyamide-6T6, polyamide-6,66, polyamide-6,6I, polyamide-6,6T. They preferably have a relative viscosity (as measured on a 1% by weight solution in m-cresol at 25° C.) of 2.0 to 5.0 and preferably 2.5 to 4.0.

The polyamides may be produced by known methods (see Kunststoff-Handbuch, Vol. VI, pages 11 to 198, Carl-Hanser-Verlag, München, 1966).

a) Phosphinic Acid Esters

The phosphinic acid esters a) used in accordance with the invention are the dialkyl, diaryl and alkylaryl phosphinic acid esters of polyphenols (novolaks) (in only partly esterified form) which still contain at least 5% of the phenolic OH groups in transesterified form. Since the phosphinic acids cannot be directly converted into the esters according to the invention, their more reactive derivatives should be used for their synthesis. These derivatives are the acid chlorides which are reacted with the polyphenols to form the esters according to the invention through elimination of hydrogen chloride and phenyl esters (also from the acid chlorides) which are correspondingly reacted by elimination of phenol (transesterification).

Examples of phosphinic acids are dimethyl phosphinic acid, methylethyl phosphinic acid, diethyl phosphinic acid, methylphenyl phosphinic acid, ethylphenyl phosphinic acid, diphenyl phosphinic acid, di-p-tolyl phosphinic acid and phenylnaphthyl phosphinic acid and also 1-hydroxy-1-oxophospholene, 1-hydroxy-1-oxo-3-methyl phospholene and 1-hydroxy-1-oxo-3,4-dimethyl phospholene.

Processes for the production of phosphinic acids and derivatives thereof, such as chlorides and phenyl esters, are known and are described in the literature (Houben-Weyl, Methoden der organischen Chemie, Vol. XII/1, pages 217 to 266, and Vol. E2, pages 123 to 221).

The reaction of the phosphinic acid chlorides with bisphenols and polyphenols takes place extremely slowly at temperatures of 180° to 200° C. with elimination of hydrogen chloride. Using catalysts, such as magnesium chloride, the reaction takes place in relatively short times at lower temperatures. At relatively low temperatures, inert, high-boiling solvents have to be used in the esterification of novolaks (for reasons of viscosity). Magnesium chloride or tertiary amines are normally used as catalysts.

In the much quicker transesterification process, magnesium chloride may also be used as catalyst. Other magnesium or zinc salts may also be used. The temperatures are again 200° C.

Novolaks are produced by known methods, cf. Houben-Weyl, Methoden der Organischen Chemie, Vol. XIV/2, pages 193 to 292, and Ullmann's Encyclopädie der technischen Chemie, 4th Edition, Vol. 18, pages 245 to 257.

Suitable novolaks are condensates of formaldehyde and phenols corresponding to general formula (I). Characteristic examples of phenols are phenol, o-cresol, m-cresol, p-cresol, 2,5-dimethyl phenol, 3,5-dimethyl phenol, 2,3,5-trimethyl phenol, 3,4,5-trimethyl phenol, p-t-butyl phenol, p-n-octyl phenol, p-stearyl phenol, p-phenyl phenol, p-(2-phenylethyl) phenol, o-isopropyl phenol, p-isopropyl phenol, m-isopropyl phenol and many other phenols; this list is by no means complete.

Preferred phenols are phenol, o-cresol, m-cresol, p-cresol, p-t-butyl phenol and o-t-butyl phenol and p-octyl phenol.

However, mixtures of these phenols may also be used.

Accordingly, preferred novolaks are, for example, phenol/formaldehyde novolak, o-cresol/formaldehyde novolak, m-cresol/formaldehyde novolak, p-cresol/formaldehyde novolak, t-butylphenol/formaldehyde novolak, p-octylphenol/formaldehyde novolak.

The p-cresol/formaldehyde novolak and the phenol/formaldehyde novolak are particularly preferred.

b) Zinc Borates (Hydrates)

Zinc borates (hydrates) may be products of differing composition (see Ullmann's Encyclopedia of Industrial Chemistry, 5th Edition, Volume A4, page 276). $2ZnO*3B_2O_3*5H_2O$ is particularly suitable as a flameproofing agent for polyamide molding compounds.

Zinc oxides may be products having varying particle sizes. "Zinkoxid-Aktiv", a product of Bayer AG, is particularly suitable as an additive for the polyamide molding compounds.

c) Aromatic Thermoplastics

Polysulfones, polyether sulfones, polyketones, polyether ketones, polyphenylene oxides and polyarylene sulfides among others are used as the thermoplastics according to the invention having a predominantly aromatic main chain and high heat resistance (Vicat B≧18020 C.). These thermoplastics are prepared by methods known from the literature. Preferred are polyphenylene sulfide, polyetersulfones from bisphenol A and 4,4- dichlorid diphenyl sulfone.

d) Antidripping Agents

The polyfluoroethylene polymers B1) suitable for use in accordance with the invention are polymers having fluorine contents of 65 to 76% by weight and preferably 70 to 76% by weight. Examples are polytetrafluoroethylene, tetrafluoroethylene/hexafluoropropylene copolymers, tetrafluoroethylene/difluoroethylene copolymers or tetrafluoroethylene copolymers containing small quantities of fluorine-free, copolymerizable, ethylenically unsaturated monomers. The polymers are known. They may be used in fine-particle form, usually as powders. They may be produced by known methods, for example by polymerization of tetrafluoroethylene in aqueous medium with a catalyst which forms free radicals, for example sodium, potassium or ammonium peroxydisulfate, under pressures of 7 to 71 kg/cm$^2$ and at temperatures of 0° to 200° C. and preferably at temperatures of 20° to 100° C. (for further details, see for example U.S. Pat. No. 2,393,967).

The polyfluoroethylene polymers suitable for use in accordance with the invention should preferably have weight average molecular weights Mw of $10^5$ to $10^6$.

The polyfluoroethylene polymers are preferably used in non-sintered form.

The addition of polyfluoroethylene polymers in particular reduces or completely prevents dripping of the molten molding compound during burning.

e) Reinforcing Materials

Inorganic reinforcing materials e) which may optionally be used in accordance with the invention include any known materials for reinforcing polyamides, such as for example glass fibers, glass beads and/or mineral fillers as described in Katz and Milewski, "Handbook of Fillers and Reinforcements for Plastics", Nostrand, 1978.

Glass fibers are preferably used as the inorganic reinforcing materials. The glass fibers used generally have a diameter of from about 6 to 15 μm and preferably from 8 to 13 μm and a length-to-thickness ratio of greater than 45 and preferably in the range from 50 to 200.

Other suitable fillers and reinforcing materials are glass microbeads, carbon fibers, chalk, quartz, such as novoculite, and silicates, such as asbestos, feldspar, mica, talcum, wollastonite, and also kaolin in calcined and non-calcined form. Other suitable fillers in pigments are alkaline earth metal carbonates, alkaline earth metal oxides, alkaline earth metal sulfates, titanium dioxide and/or zinc sulfide. The mineral fillers used have average particle diameters of less than 20 μm, preferably less than 10 μm and, more preferably, from 2 to 8 μm. They may be suitably surface-modified, for example treated with aminoalkyl silane.

f) Processing Aids

Mold release agents, stabilizers, flow aids and plasticizers may be added as processing aids f) to the molding compounds according to the invention.

Suitable mold release agents are ester waxes, for example montan wax, amide wax, such as Rhenax®, and/or oligoethylenes. Suitable plasticizers are, for example, aliphatic oligomeric polyesters (see EP 29 931 and DE 27 06 128).

g) Impact Modifiers

Particularly suitable impact modifiers are rubbers, such as butadiene/acrylonitrile copolymers, butadiene/styrene copolymers, butadiene/styrene block copolymers, alkyl acrylate rubbers, EP and EPDM rubber systems and also silicone rubbers. The rubber component is preferably selected from graft rubbers in which vinyl monomers or copolymers are grafted onto one of the above-mentioned rubber systems; the glass temperature of the graft base should be below −10° C. Preferred graft rubbers are graft rubbers of the MBS or MABS or EP or EPDM or EBDM rubber type (E=ethylene, B=butylene, P=propylene), onto which maleic anhydride or styrene/maleic anhydride have been grafted in small quantities. Other examples can be found in U.S. Pat. Nos. 4,174,358, 3,845,163 and 3,668,274.

The blends of thermoplastic polyamides, phosphinic acid esters of polyphenols, polyfluoroethylene polymers and/or aramides, thermoplastics having a predominantly aromatic main chain and high heat resistance (Vicat B≧180° C.), inorganic reinforcing materials, fillers and pigments and also processing aids may be produced in standard mixing units, such as rolls, kneaders, single-screw and multiple-screw extruders. The processing aids may be added either as concentrates in thermoplastic polyamide, in granular form or as a powder blend during compounding of the components. The temperature at which the mixtures and moldings thereof are produced should typically be in the range from 260° to 285° C.

The production process may be carried out both discontinuously and also continuously under conditions which largely preclude oxidation, i.e. preferably in an inert gas atmosphere. Suitable inert gases are, for example, nitrogen, carbon dioxide and/or argon.

The flameproofed polyamide moldings are particularly suitable for use in the electrical and automotive fields and are used, for example, for the production of housings and covers for such industrially manufactured goods as electrical household appliances and for automobile parts. They are distinguished by particular migration stability of the additives and also reduce the water absorption of polyamides, such as polycaprolactam, and give moldings of high modulus and rigidity.

EXAMPLES

A. Component Used

I. Polyamide-66 having a relative viscosity of 3.0, as measured on a 1% solution in m-cresol at 25° C.; granules, II. Polyamide-6 having a relative viscosity of 3.0, as measured on a 1% solution in m-cresol at 25° C., granules, III. Reaction product (ester) of a novolak of p-cresol and formaldehyde, starting OH value 468, number of cresol nuclei approx. 5, and 1-phenoxy-1-oxo-3-methyl phospholene and a resulting OH value of 102, IV. Reaction product (ester) of a novolak of phenol and formaldehyde, starting OH value 512, number of phenol nuclei approx. 5, and 1-phenoxy-1-oxo-3-methyl phospholene and a resulting OH value of 115, V. Reaction product (ester) of a novolak of p-cresol and formaldehyde, starting OH value 468, number of cresol nuclei approx. 5, and 1-phenoxy-1-oxo-3-methyl phospholene and a resulting OH value of 52, VI. Reaction product (ester) of a novolak of phenol and formaldehyde, starting OH value 512, number of phenol nuclei approx. 5, and 1-phenoxy-1-oxo-3-methyl phospholene and a resulting OH value of 56, VII. Zinc borate (hydrate), $2ZnO*B_2O_3*5H_2O$, Firebreak® ZB, a product of U.S. Borax & Chemical Corp., U.S.A.

VIII. Zinkoxid-Aktiv®, a product of Bayer A.G.,

IX. Polyphenylene sulfide,

X. Polyether sulfone of bisphenol A and 4,4,-dichlorodiphenyl sulfone,

XI. Polytetrafluoroethylene powder, Hostaflon® TF 2027, a product of Hoechst A.G., XII. Chopped strands, type CS 7919, a product of Bayer A.G.

B. General Procedure for the Preparation of the Phosphinic Acid Esters

1 OH equivalent novolak is weighed with the corresponding molar quantity of 1-phenoxy-1-oxo-3-methyl phospholene and 0.5 mol-% anhydrous zinc acetate into a 500 ml three-necked flask equipped with a thermometer, stirrer and distillation column. The apparatus is purged with nitrogen and heated with stirring to 200° C. under 300 hPa. After 30 minutes, the pressure in the apparatus is continuously reduced to 3 hPa over a period of 2 hours during which phenol is distilled off. The internal temperature is then increased to 250° C. and the reaction mixture is distilled out for 1 hour. The contents of the flask are poured out and solidify like glass on cooling. There is no need for further working up.

C. Production, Processing and Testing of the Molding Compounds

The components used are melted, mixed, extruded to strands and granulated in a twin-screw extruder in the quantities (% by weight) shown in Table 1. The molding compounds may be produced, for example, in a Werner und Pfleiderer ZSK 32 extruder at melt temperatures of 275° to 300° C., at a screw speed of 100 to 150 r.p.m. and at a throughput of 8 to 12 kg/h.

After adequate drying (for example up to 4 hours at 120° C.), the molding compounds are injection-molded to moldings or standard test specimens in standard injection molding machines at melt temperatures of 260° to 290° C., at a mold temperature of approximately 80° C. and with a residence time in the melt of no more than 8 minutes and subjected to the Underwriters' Laboratories UL 94 Fire Test. The test results obtained are shown in Table 2.

TABLE 1

| Components Example | \multicolumn{12}{c}{Composition of the polyamide molding compounds in % by weight} | | | | | | | | | | | |
|---|---|---|---|---|---|---|---|---|---|---|---|---|
|  | I | II | III | IV | V | VI | VII | VIII | IX | X | XI | XII |
| 1 | 64.5 | 0 | 20 | 0 | 0 | 0 | 8 | 0 | 15 | 0 | 0.5 | 0 |
| 2 | 0 | 64.5 | 20 | 0 | 0 | 0 | 8 | 0 | 15 | 0 | 0.5 | 0 |
| 3 | 64.5 | 0 | 0 | 20 | 0 | 0 | 8 | 0 | 15 | 0 | 0.5 | 0 |
| 4 | 64.5 | 0 | 0 | 0 | 20 | 0 | 8 | 0 | 15 | 0 | 0.5 | 0 |
| 5 | 64.5 | 0 | 20 | 0 | 0 | 20 | 8 | 0 | 15 | 0 | 0.5 | 0 |
| 6 | 64.5 | 0 | 20 | 0 | 0 | 0 | 6 | 2 | 15 | 0 | 0.5 | 0 |
| 7 | 43.0 | 21.5 | 20 | 0 | 0 | 0 | 8 | 0 | 15 | 0 | 0.5 | 0 |
| 8 | 21.5 | 43.0 | 20 | 0 | 0 | 0 | 8 | 0 | 15 | 0 | 0.5 | 0 |
| 9 | 64.5 | 0 | 20 | 0 | 0 | 0 | 8 | 0 | 0 | 15 | 0.5 | 0 |
| 10 | 57.5 | 0 | 17 | 0 | 0 | 0 | 8 | 0 | 15 | — | 0 | 10 |
| 11 | 55.5 | 0 | 17 | 0 | 0 | 0 | 8 | 0 | 12 | 0 | 0 | 15 |

TABLE 2

| | Results of the UL 94 Fire Test | |
|---|---|---|
| Example | Dripping behavior | Burning behavior, wall thickness, 1.6 mm |
| 1 | Does not drip | V - 0 |
| 2 | Does not drip | V - 0 |
| 3 | Does not drip | V - 0 |
| 4 | Does not drip | V - 0 |
| 5 | Does not drip | V - 0 |
| 6 | Does not drip | V - 0 |
| 7 | Does not drip | V - 0 |
| 8 | Does not drip | V - 0 |
| 9 | Does not drip | V - 0 |
| 10 | Does not drip | V - 0 |
| 11 | Does not drip | V - 0 |

We claim:

1. Flameproofed non-drip polyamide molding compounds which contain the following additions per 100 parts by weight molding compound:

a) 3 to 25% by weight partly esterified polyphenol phosphinic acid esters containing 3 to 75% free phenolic OH groups (OX=OH), corresponding to the formula (I)

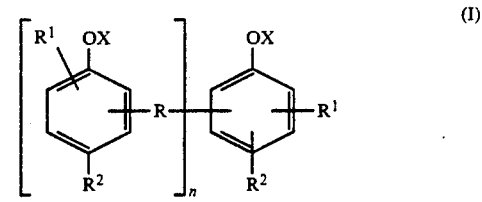

in which n is an integer of 1 to 20

R is a $C_{1-4}$ alkylene group, a $C_{5-9}$ cycloalkylene group or, where n=1, a direct bond, a sulfonyl or carbonyl group or oxygen or sulfur, $R^1$ and $R^2$ are hydrogen, halogen, $C_{1-12}$ alkyl groups, $C_{5-8}$ cycloalkyl groups, $C_{6-10}$ aryl groups, X is either hydrogen or $-P(O)R^3R^4$, but on average at least once a $-P(O)R^3R^4$ group, $R^3$ and $R^4$ may be the same or different and represent $C_{1-12}$ alkyl groups, cycloalkyl groups containing 5 to 8 carbon atoms in the ring and optionally up to 3 alkyl substituents at the cycloalkyl ring and/or C$_{6-10}$ aryl groups; R$^3$ and R$^4$ together may also represent an alkylene radical which may be saturated or unsaturated (C=C double bond) and additionally contains 4 to 8 carbon atoms and the ring formed optionally contains C$_{1-4}$ alkyl substituents at this ring, b) 1 to 15% by weight and zinc borate and/or zinc oxide, c) 0 to 30% by weight of a thermoplastic having a predominantly aromatic main chain and, optionally, other additives selected from the group consisting of d) 0 to 3% by weight antidripping agents, e) 0 to 40% by weight inorganic reinforcing materials and/or mineral fillers and/or pigments and f) 0 to 10% by weight processing aids.

2. Polyamide molding compounds as claimed in claim 1 characterized in that the partly esterified polyphenol phosphinic acid esters used are based on novolaks and correspond to formula III

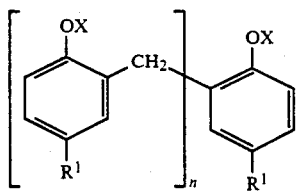

(III)

in which n and R$^1$ are as defined above; and X is H and a group corresponding to formula (IV)

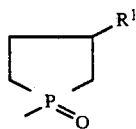

(IV)

3. Polyamide molding compounds as claimed in claim 1, characterized in that the phosphonic acid esters (I) contain 5 to 40% free phenolic OH groups in addition to the phosphinic acid ester groups in the polyphenols.

4. Polyamide molding compounds as claimed in claim 1 characterized in that polyamide-6, polyamide-66 or polyamides of ε-caprolactam, hexamethylene diamine, adipic acid are used.

5. Polyamide molding compounds as claimed in claim 1 characterized in that isophthalic acid and/or terephthalic acid are used together with or without adipic acid for the production of the polyamides.

6. Polyamide molding compounds as claimed in claim 1, characterized in that the partly esterified phosphinic acid esters of polyphenols (component A) are used in quantities of 5 to 22% by weight.

7. Polyamide molding compounds as claimed in claim 1, characterized in that polyarylene sulfides or polyether sulfones of bisphenol A and 4,4'-dichlorodiphenyl sulfone are used as the thermoplastic having a predominantly aromatic main chain.

8. Polyamide molding compounds as claimed in claim 1 characterized in that partly esterified polyphenol phosphinic acid esters of polyphenols corresponding to formula II are used as condensation products of phenols with aldehydes or ketones

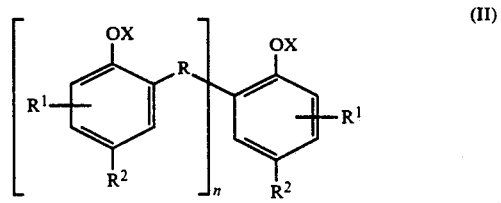

(II)

in which n, R, R$^1$, R$^2$ and X are as defined in claim 1.

9. A process for the production of the polyamide molding compounds claimed in claim 1 characterized in that the components are mixed and are melt-compounded or melt-extruded at temperatures of 200° to 300° C. or the components are melt-compounded or melt-extruded in individual steps to form the final compound.

10. The molding compounds of claim 1, wherein n is an integer of 2 to 10, and the compounds contain 3 to 12% by weight of b), 5 to 25% by weight of c), 0.5 to 2% by weight of d), 10 to 30% by weight of e), and 0.5 to 5% by weight of f).

11. The molding compounds of claim 3, wherein the phosphinic acid esters (I) contain 10 to 30% free phenolic OH groups.

12. The molding compounds of claim 6, wherein component a) is present in 5 to 50% by weight.

13. The molding compounds of claim 7, wherein the polyarylene sulfide is polyphenylene sulfide.

14. The molding compounds of claim 2, wherein n is 2 to 6, and R$^1$ is methyl.

15. The molding compounds of claim 1, wherein the phosphinic acid esters (I) contain 5 to 40% free phenolic OH groups.

* * * * *